Figure 1:
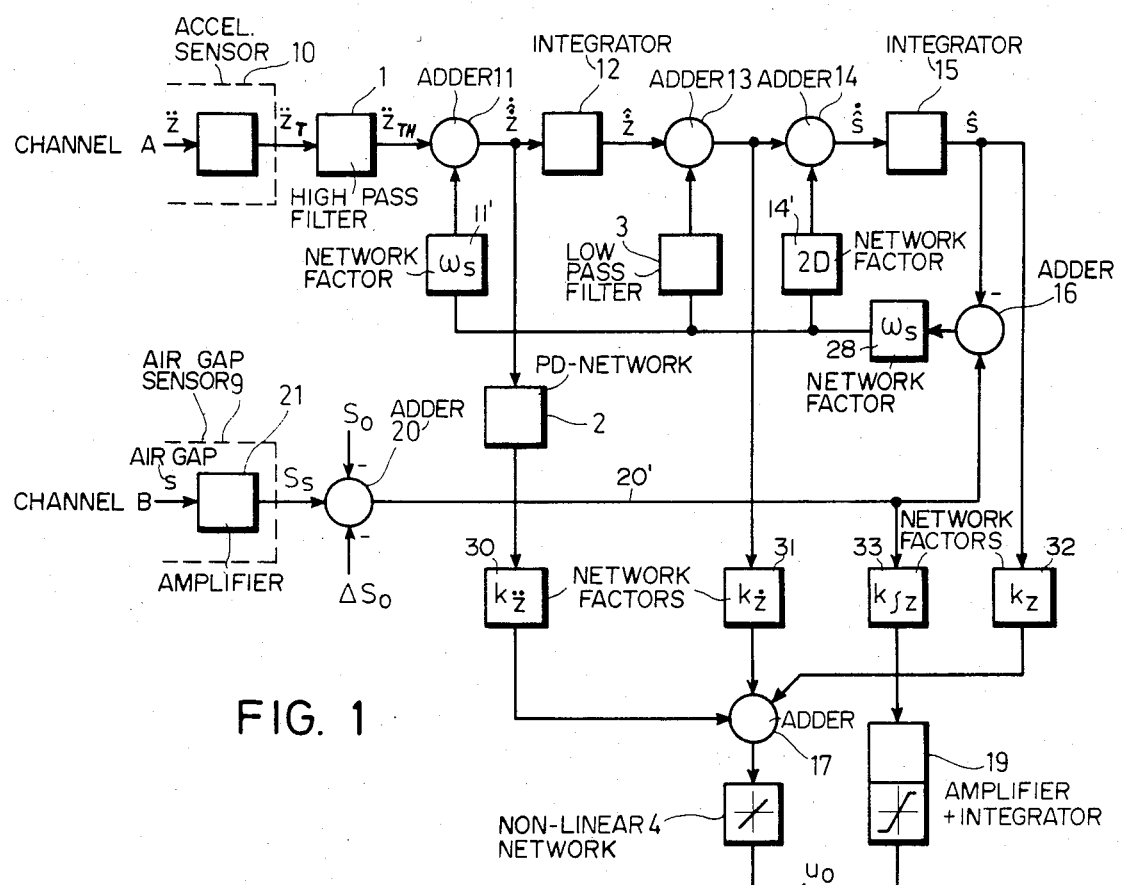

United States Patent [19]

Gottzein et al.

[11] Patent Number: 4,505,206
[45] Date of Patent: Mar. 19, 1985

[54] METHOD AND CIRCUIT ARRANGEMENT FOR OPTIMALLY CONTROLLING AN AIR GAP BETWEEN AN ELECTROMAGNETICALLY LEVITATED VEHICLE AND A RAIL

[75] Inventors: Eveline Gottzein, Oberpframmern; Rolf Keeve, Munich; Michael Surauer, Chieming, all of Fed. Rep. of Germany

[73] Assignee: Messerschmitt-Boelkow-Blohm Gesellschaft mit beschraenkter Haftung, Munich, Fed. Rep. of Germany

[21] Appl. No.: 370,166

[22] Filed: Apr. 20, 1982

[30] Foreign Application Priority Data

May 7, 1981 [DE] Fed. Rep. of Germany ....... 3117971

[51] Int. Cl.$^3$ ............................................. B61B 13/08
[52] U.S. Cl. ...................... 104/284; 104/290; 318/135; 318/587
[58] Field of Search ................... 191/10; 104/282, 284, 104/290, 292, 293, 281; 318/135, 587, 687

[56] References Cited

U.S. PATENT DOCUMENTS

| 3,549,966 | 12/1970 | Wilson | 318/135 |
| 3,638,093 | 1/1972 | Ross | 318/135 X |
| 3,736,880 | 6/1973 | Ross | 318/135 X |
| 3,742,862 | 7/1973 | Gebhardt et al. | 104/284 |
| 3,804,024 | 4/1974 | Gottzein et al. | 104/284 |
| 3,861,321 | 1/1975 | Goodnight et al. | 104/284 |
| 3,871,301 | 3/1975 | Kolm et al. | 104/284 X |
| 3,937,148 | 2/1976 | Simpson | 104/284 X |
| 4,140,063 | 2/1979 | Nakamura | 104/284 |

FOREIGN PATENT DOCUMENTS 2127047 12/1972 Fed. Rep. of Germany.
2446936 4/1976 Fed. Rep. of Germany ...... 104/284

Primary Examiner—David A. Scherbel
Assistant Examiner—Edward M. Wacyra
Attorney, Agent, or Firm—W. G. Fasse; D. H. Kane, Jr.

[57] ABSTRACT

The air gap between the rail or rails and an electromagnetically levitated vehicle is optimally controlled with regard to the power or energy consumption. This result is achieved by a control employing two control channels. One control channel is constructed as a non-linear support or guide controller for regulating or contolling the air gap width in response to disturbances of short duration. The other control channel is constructed to cause a reduction of the air gap width or rather of the rated air gap width for adapting of the air gap width to the spectrum and amplitude distribution of the disturbances to which the levitated vehicle is exposed. This type of control may be employed for the regulating of the air gap between the support magnets and the respective rail and also for controlling the air gap between the guide magnet and the respective rail to reduce the energy required for maintaining these air gaps at an optimally efficient width.

2 Claims, 2 Drawing Figures

METHOD AND CIRCUIT ARRANGEMENT FOR OPTIMALLY CONTROLLING AN AIR GAP BETWEEN AN ELECTROMAGNETICALLY LEVITATED VEHICLE AND A RAIL

BACKGROUND OF THE INVENTION

The present invention relates to a method and circuit arrangement for optimally controlling an air gap between an electromagnetically levitated vehicle and a rail for the purpose of adapting the air gap between the rail and the respective magnet to unknown disturbances to which the vehicle may be exposed or which may be present in the rail system.

German Patent Publications (DE-OS) Nos. 2,112,047 and (DE-OS) 2,446,936 disclose control systems for the controlling or regulating of such vehicles known as electromagnetically levitated vehicles.

The control systems disclosed in the just mentioned references and any other known control concepts which are employed in connection with the control and guiding of magnetically levitated vehicles leave room for improvement. For example, prior to this invention it has been very difficult and in connection with larger vehicles capable of very rapid travel even impossible to satisfy all the desirable requirements. Such requirements include the needed stability of the vehicle in its stationary condition, a satisfactory travelling characteristic on any given or expectable roadway such as a rail system while maintaining a relatively small rated air gap between the levitation magnet and the respective rail and between the guide magnet or magnets and the respective rail while taking into account a given battery or operating voltage.

The predetermined rated air gap in present day systems is smaller than or equal to ten millimeters due to the rated or prescribed maximum power of the entire control system. Especially in connection with larger, rapidly moving vehicles such a rated air gap dimension would cause, in connection with prior art control systems that either the magnets impact on the rails of the rail system or that it is necessary to increase the size of the rated air gap until an operation free of troubles is assured. The impacting of the magnets on the respective rails cannot be tolerated because it results in unpermissibly high structural stresses or loads whereby, for example, individual magnets could even be torn off their mountings.

The rated air gap may also be increased in its size in response to the travelling speed. However, this approach has the disadvantage that even small air gap increases require an enormous increase in the energy necessary for such increase. For example, if the rated air gap width is supposed to be increased by only 20% corresponding to about 2 mm of a normally 10 mm gap width, the power input increases by at least 44%.

OBJECTS OF THE INVENTION

In view of the above it is the aim of the invention to achieve the following objects singly or in combination:

to perform the air gap control or regulation and the adaptation of the rated air gap in connection with electromagnetically levitated vehicles in such a manner that a safe travel is assured in all speed ranges including high travelling speeds while simultaneously assuring a minimal power consumption for the gap maintenance or adaptation;

to employ two control or regulating channels or systems simultaneously in a superimposed manner so that the size of the air gap is optimally adapted to the quality of the particular rail section of the supporting rail system and to the instantaneous speed; and to assure a high stability range at all speeds and also when the vehicle is stationary.

SUMMARY OF THE INVENTION

According to the invention there is provided a method and circuit arrangement or system for optimally controlling an air gap between an electromagnetically levitated vehicle and a rail in which two control or regulating channels are employed. The first channel is constructed as a non-linear support circuit controller for regulating or controlling the air gap width in response to disturbances of relatively short durations whereas the second channel or system causes an air gap width reduction in response to the spectrum and amplitude distribution of the disturbances, thereby adapting the rated air gap reduction to such disturbances.

The present teaching may be employed for the control or regulation of the air gap between the supporting magnets and the rail structure and also for the control or regulation of the air gap between the guide magnets and the respective guide rails of the rail system. Due to the cooperation of the two control channels the invention provides the possibility to optimally adapt the air gap width to the quality of the particular rail section of the rail system on which the vehicle is travelling and to provide the same adaptation relative to the travelling speed.

BRIEF FIGURE DESCRIPTION

Figure 2:
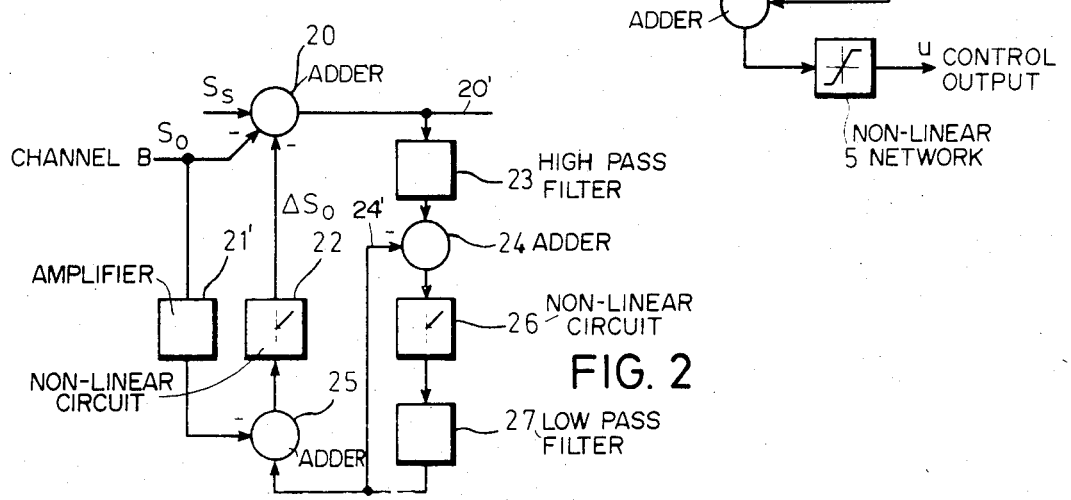

In order that the invention may be clearly understood, it will now be described, by way of example, with reference to the accompanying drawings, wherein:

FIG. 1 is a block circuit diagram of the first and second regulating or control channels according to the invention for producing the gap control signal; and FIG. 2 is a block circuit diagram showing the second control or regulating channel in more detail.

DETAILED DESCRIPTION OF PREFERRED EXAMPLE EMBODIMENTS AND OF THE BEST MODE OF THE INVENTION

FIG. 1 illustrates the block circuit diagram of both channels A and B for controlling or regulating the air gap between a levitating or guide magnet and a rail not shown. The first channel A is constructed to satisfy the requirement for a stable vehicle during travel and when the vehicle is stationary, thereby taking into account a given battery voltage range. The circuit makes sure that the vehicle follows the line of the rail system including all its structural tolerances as well as the resulting elastic deformations of the rail system including any bumps and depressions. According to the invention such following of the rail line is assured at speeds up to 400 kilometers per hour. Simultaneously the present system ignores or shuts out high frequency disturbances having a small amplitude. The present system also avoids the impacting of the magnet or magnets on the rail when random disturbances of high amplitude, but short durations occur.

A magnetically or electromagnetically levitated vehicle may be visualized in a spacial coordinate system having X, Y, and Z axes. Please see in this connection the above mentioned German Patent Publication (DE-OS) No. 2,446,936. In the present context the Z-axis is of special interest and FIG. 1 relates to the acceleration in the direction of the Z-axis $_T$. This acceleration $_T$ is sensed by the sensor 10 of conventional construction. The output of the sensor 10 is supplied to the input of a high pass filter 1 having such a characteristic that it provides a high damping outside its path range. Stated differently, this filter provides a higher stability range due to a better phase position in the important frequency ranges. Thus, a smaller air gap deviation will result when following low frequency disturbances since the influence of the acceleration signal will be smaller for low frequency disturbances. Accordingly, an optimal adaptation of the following and stability is accomplished. The term "following" in this context means the maintaining of a predetermined air gap width.

The output signal $_{TH}$ of the high pass filter 1 is supplied to one input of a summing network 11. The other input of the summing network 11 receives a network factor signal $\omega_S$ provided by a respective network factor circuit 11' which is a conventional signal conditioner for forming the network factor signal $\omega_S$ from estimated air gap values and from the vehicle speed or from the acceleration in the Z-direction. A signal value Z representing the first derivation of an estimated value appears at the output of the adder or summing circuit 11. This first derivation signal value Z represents the speed of the levitated vehicle in the Z-direction. This first derivation value based on an estimate is supplied to an input of an integrating circuit 12 and to an input of a PD-network 2 which is a proportional/differential or proportional/derivative network also known as lead-lag circuit. The output of the PD-network 2 is supplied to a signal network factor circuit 30 of conventional construction for conditioning providing the factor k. The output of the integrator circuit 12 is connected to one input of an adder 13 the other input of which is connected to the output of a low-pass filter 3 which evaluates the network factor $\omega_S$ received from a respective conventional signal conditioning circuit 28. The output of the adder 13 is connected to one input of a further summing circuit 14. The other input of the further summing circuit 14 receives a network factor signal 2D from a respective conventional signal conditioning circuit 14' which evaluates the network factor $\omega_S$ from the circuit 28. The output of the adder 13 is supplied to a conventional signal conditioning circuit 31 providing a network factor $k_Z$. The output of the summing circuit or adder 14 provides the first derivation S of the estimated air gap value S. This first derivation S of the estimated air gap value is supplied to the input of an integrator circuit 15, the output of which provides the estimated air gap value S. The output of the integrator 15 is connected to one input of a further summing circuit or adder 16 and also to a conventional signal conditioning network factor circuit 32 providing the network factor $k_Z$.

The other input of the summing network or adder 16 is connected to the output of the second channel B which receives at its input an air gap value S sensed by an air gap sensor 9 which may be a low-pass filter including an amplifier 21 which provides at its output the measured air gap signal $S_s$. This measured air gap signal $S_s$ is supplied to one input of a further adding circuit 20 having additional inputs for the rated air gap signal $S_o$ and for the increase or decrease $\Delta S_o$ of the rated air gap signal. The output 20' of the adder 20 is connected to the adder 16 and to a conventional network factor signal conditioning circuit 33 providing the network factor k $_Z$.

Referring further to FIG. 1 the network factors $k_Z$, $k_Z$, and k are supplied to three respective inputs of a summing or adding circuit 17 the output of which is connected to a non-linear network 4 which in turn is connected to one input of an adder 18 which further receives at another input the voltage $u_o$ and at a still further input the output signal from a signal transmitting circuit 19 including an amplifier, for example, and an integrator. The input of the circuit 19 is connected to the output 20' of the air gap sensing channel circuit B through a conventional network factor signal conditioning circuit 33 providing the network factor k $_Z$. A non-linear network 5 is connected to the output of the adder 18 and provides at its output the control signal u for controlling the air gap width.

FIG. 2 shows the channel B in more detail. In addition to receiving the air gap signal $S_s$ at one input, the adder 20 also receives the rated air gap value $S_o$ and the signal $\Delta S_o$ for modifying the air gap. The output 20' of the adder 20 is connected in addition to the above mentioned adder 16 and to the network factor circuit k $_Z$ also to a high-pass filter 23 the output of which is connected to an adder 24 which receives at a further input 24' a feedback signal from the output of a low-pass filter 27 the input of which is connected through a nonlinear circuit 26 to the output of the adder 24. Further, the output of the low-pass filter 27 is connected to one input of an adder 25, the output of which is connected to a further nonlinear circuit 22 which in turn provides at its output the air gap variation signal value $\Delta S_o$. The other input of the adder 25 receives a signal through the amplifier 21' which is derived from the rated air gap value $S_o$.

In operation, the high pass filter 1 which is of the second order achieves a higher damping as well as a smaller gap deviation. The ascertained acceleration or rather the first derivation at the output of the adder 11 is evaluated by the PD-network 2. In an electromagnetic feedback or closed loop control the resonance values which are subject to poor damping, are within the range of 6 to 20 Hz. Therefore, these resonance values are damped, especially by the higher amplitudes and the better phase relation or location. This feature in turn has the result, among others, that a smoother frequency response characteristic of the system in its following ability is achieved.

Due to the low-pass filter 3 the control voltage u is kept within predetermined limits for higher frequencies in the following. That is, rail line deviations, for example, caused by tolerances and having a short wave are substantially prevented from influencing the control. Such short wave deviations in the rail line from an ideal rail have a high frequency range and following in such high frequency range is not desirable. However, the following characteristic or control function would be reduced in those areas where it is necessary if the control voltage u is produced without the low-pass filter 3.

The non-linear networks 4 and 5 are employed for making sure that the respective magnet is first or initially moved away from the corresponding rail in response to suddenly occurring disturbances of large amplitude. Stated differently, the evaluation or value allocation of an air gap, the width of which is being reduced as a result of a high amplitude disturbance, is higher than under normal operating conditions. This higher evaluation is accomplished by the non-linear circuit 4 while the non-linear circuit 5 assures a nonsymmetric limitation, thereby providing a negative d.c. component and a resulting gap increase.

The above described second channel B makes sure that the rated air gap value $S_o$ is reduced in a continuous adaptation to respective disturbances. The summing network 20, as described, receives the air gap signal $S_s$ measured by the air gap sensor 9 and this signal is reduced by the negative rated air gap signal $S_o$ and by the negative rated air gap value modification $\Delta S_o$. Incidentally, the amplifier 21' provides a negative signal at its output for the adder 25, whereby this signal also reduces the sum produced in the adder 25.

The circuit arrangement of the second channel B as described above makes sure that the air gap is increased when large disturbances occur in respective track sections in order to avoid an impact of the magnet on the rail. As a result, the power consumption for the energization of the magnets is increased only along those track sections causing large disturbances.

When a travelling vehicle is in a transition between a good track section causing but few, if any, disturbances, to a poor track section, the change-over to a gap reduction is prevented by a gap increase. This is accomplished because the high-pass 23 and the amplifications as taught herein assure an evaluation of disturbances with regard to their frequency and with regard to their amplitude so that the second control channel B becomes effective only when the vehicle is travelling rapidly and when the disturbances have a respective amplitude spectrum.

Due to the negative sign of the high pass filter, deviations of the air gap are evaluated with regard to their direction toward the rail, in other words with regard to an air gap reduction. Improvements in the following characteristic may additionally be achieved in the first control channel A, or rather in the dynamic thereof, by reducing the damping in that frequency range in which a following is desirable.

On the other hand, due to a positive feedback of the rated air gap reduction it is possible to provide a reduced damping which is effective only starting at determined input disturbances and larger amplifications.

If the negative sign of the high-pass filter is not used, the air gap deviations are evaluated in a direction away from the rail, in other words, in response to air gap increases. The positive feedback does not appear to adversely influence the stability of the first control channel A.

It is also possible to achieve the reduction of the rated air gap value $S_o$ by a forward control circuit rather than by a feedback circuit. When a forward control circuit is used, the adder 20 is also employed for the $\Delta S_o$ signal, whereby the measured air gap signal $S_s$ is applied to the high-pass filter.

Further, instead of using the low-pass filter 27 in the channel B it is possible to use a peak rectifier circuit having the same dynamic characteristic that is a rapid rise of the input signal followed by a slow decrease of the respective signal value.

The circuit 11' for the network factor $\omega_S$ and the circuit 14' for the network factor 2D may, in the simplest instance, be resistors. This also applies to the circuit 28. These circuits 28, 14', and 11' are feedback circuits which supply the output of the adder 16 to one input of the adder 14 and one input of the adder 11. These resistors are effective in a multiplying sense even if the multiplying factor should be less than one. The circuits 28 and 11' together provide a factor of $\omega_s^2$. The circuit 14' multiplies the signal $\omega_S$ from the resistor 28 with a factor 2D and supplies the respective product signal to one input of the adder 14 as mentioned. The signal $\omega_S$ is the frequency of the gap signal coming on the line 20' as measured by the air gap sensor 9. The network factor 2D conditions the signal by damping the signal to provide a signal smoothing. On the other hand, the feedback signal $\omega_s^2$ as applied to one input of the adder 11 determines the band width of the system. By using the double feedback through the resistors 28, 14', and 11' a second order oscillator is established. Such an oscillator efficiently separates the useful signal component from the noise signal component, thereby optimally utilizing the energy required for the levitation of a vehicle. Further, the network factors 30, 31 and 32 can also be multiplying resistors for multiplying the respective signals with a constant factor k. The circuit 33 is an integrator and constant factor multiplier as shown in FIG. 1.

Although the invention has been described with reference to specific example embodiments, it will be appreciated, that it is intended, to cover all modifications and equivalents within the scope of the appended claims.

What is claimed is:

1. A method for optimally controlling the adaptation of an air gap between a magnet of an electromagnetically levitated vehicle and a rail on which the vehicle is travelling, to unknown disturbances with the aid of a closed loop control circuit, comprising the following steps: supplying to said closed loop control circuit a weighted acceleration signal representing said unknown disturbance, providing said closed loop control circuit with non-linear circuit means (4, 5) for limiting substantially those disturbances which occur for short time durations, but have high amplitudes, measuring an actual air gap representing signal value (S), forming a difference signal value ($\Delta S_o$) between said actual air gap representing signal value and a rated air gap signal value ($S_o$), and supplying said difference signal value ($\Delta S_o$) to a summing circuit (20) for increasing said rated air gap signal value ($S_o$) when said high amplitude disturbances occur, whereby said rated air gap value ($S_o$) is continuously changed with reference to said actual air gap representing signal value (S).

2. A circuit arrangement for optimally controlling an air gap between a magnet of an electromagnetically levitated vehicle and a respective rail, comprising a first control channel (A) including acceleration sensor means (10) for providing an acceleration representing signal ($\tau$) of an acceleration of the vehicle in a given direction, high-pass filter means (1) connected with an input to said acceleration sensor means (10), said high-pass filter means (1) having a characteristic for providing a high damping of the acceleration representing signal in a predetermined frequency range and for evaluating said acceleration representing signal at a lower level in a frequency range lower than said predetermined frequency range, proportional-derivative-circuit means (2) operatively connected to an output of said high-pass filter means (1) for evaluating the acceleration (Z), low-pass filter means (3) operatively connected for limiting control voltages at higher frequencies, non-linear circuit means (4, 5) operatively arranged for providing a negative d.c. component of the air gap control signal by evaluating a diminishing air gap value at a higher level in response to disturbances having large amplitudes and by providing a non-symmetric signal limitation, and a second control channel (B) including means (9) for sensing the actual, instantaneous air gap width, further high-pass filter means (23) including negative sign amplifier means in said second control channel (B) for evaluating air gap deviations toward said rail from a rated air gap value, and for further evaluating disturbances calling for corrective action only when a vehicle travels at high speed, said further evaluating taking place in response to the frequency and amplitude range of said disturbances calling for corrective action, and low-pass filter means (27) in said second control channel (B) including feed-back circuit means (24') for rapidly establishing a difference rated air gap input signal in said second control channel (B) and for causing a slow trailing edge of said difference rated air gap input signal.

* * * * *

UNITED STATES PATENT AND TRADEMARK OFFICE
CERTIFICATE OF CORRECTION

PATENT NO. : 4,505,206
DATED : March 19, 1985
INVENTOR(S) : Eveline Gottzein, Rolf Keeve, Michael Surauer It is certified that error appears in the above—identified patent and that said Letters Patent is hereby corrected as shown below:

In [57] ABSTRACT, line 6, replace "contolling" by --controlling--.

Column 3, line 4, replace "$_T$" by --$\ddot{Z}_T$-- (in both instances);

line 18, replace "$_{TH}$" by --$\ddot{Z}_{TH}$--;

line 26, replace "Z" by --$\dot{Z}$--;

line 28, replace "Z" by --$\dot{Z}$--;

line 35, after "signal" insert --conditioning--;

line 36, delete "conditioning", replace "k" by --$k_{\dot{Z}}$--;

line 49, replace "$k_Z$" by --$k_{\dot{Z}}$--;

line 50, replace "S" by --$\dot{S}$--;

line 51, replace "S" by --$\dot{S}$--;

line 54, replace "S" by --$\hat{S}$--.

UNITED STATES PATENT AND TRADEMARK OFFICE
CERTIFICATE OF CORRECTION

PATENT NO. : 4,505,206

DATED : March 19, 1985

INVENTOR(S) : Eveline Gottzein, Rolf Keeve, Michael Surauer

It is certified that error appears in the above—identified patent and that said Letters Patent is hereby corrected as shown below:

Column 4, line 3, replace "$k_z$" by --$k\!\!\int_z$--;

line 5, replace "$k_z$" by --$k\dot{_z}$--, replace "$k$" by --$k\ddot{_z}$--;

line 15, replace "$k_z$" by --$k\!\!\int_z$--;

line 24, replace "$k_z$" by --$k\!\!\int_z$--.

Column 6, line 53, replace "($_T$)" by --($\ddot{Z}_T$)--;

line 64, replace "(Z)" by --($\dot{Z}$)--.

Signed and Sealed this

Twentieth Day of August 1985

[SEAL]

*Attest:*

DONALD J. QUIGG

*Attesting Officer*     *Acting Commissioner of Patents and Trademarks*